United States Patent [19]

Badalamenti et al.

[11] Patent Number: 4,548,574
[45] Date of Patent: Oct. 22, 1985

[54] BLOW MOLDING DETABBER

[75] Inventors: Vito Badalamenti, Santa Rosa; Nicholas J. Weller, Petaluma, both of Calif.

[73] Assignee: Kal Tool Engineering, Petaluma, Calif.

[21] Appl. No.: 664,542

[22] Filed: Oct. 25, 1984

[51] Int. Cl.⁴ .................. B29C 17/12; B29C 17/07; B29C 23/00
[52] U.S. Cl. ................ 425/531; 425/DIG. 51; 425/806 A; 264/161; 425/806
[58] Field of Search .......... 264/161; 425/531, 806 A, 425/DIG. 51

[56] References Cited

U.S. PATENT DOCUMENTS

| 3,040,376 | 6/1962 | Elphee | 264/161 |
| 3,142,089 | 7/1964 | Wilkalis et al. | 264/161 X |
| 3,593,374 | 7/1971 | Sierd | 264/161 X |
| 4,380,423 | 4/1983 | Aoki | 425/531 X |
| 4,381,183 | 4/1983 | Bowers et al. | 425/531 X |

*Primary Examiner*—J. Howard Flint, Jr.
*Attorney, Agent, or Firm*—Melvin R. Stidham

[57] ABSTRACT

The disclosure is of a tab-pulling device comprising a simple dovetail slide that grips a tab of a blow molded object between it and a planar, stationary jaw. As the tab-pulling jaw moves downward, a plunger or pusher finger carried thereon is projected outward to strip the tab from the movable jaw.

5 Claims, 3 Drawing Figures

BLOW MOLDING DETABBER

BACKGROUND OF THE INVENTION

In conventional blow molding machines, a tube of soft plastic is pinched off at the bottom by the closing action of a two-part mold, and compressed air or the like is introduced at the top to inflate the tube to fill the mold cavity. In this way, plastic bottles of various, and unusual configurations can be produced at a rapid rate. However, a tab of plastic that is formed when the tube is pinched together at the bottom must be removed prior to completion of the process. Conventionally, a pair of gripping jaws grip the depending tab and pull it to free it from the bottom of the molded bottle and then pivot to drop it. This complex motion, which is repeated at a rapid rate over long production runs, often results in excessive wear on bearings and requires considerable lubrication. The lubrication, itself, created problems in that oil and grease frequently spotted the plastic bottles being produced. The problem was previously resolved to some extent by the detabbing device shown in U.S. Pat. No. 4,419,063 but there is still required a camming end pivoting action to separate the tab-pulling jaws and eject the tab.

OBJECTS OF THE INVENTION

It is an object of this invention to provide a detabber for a blow molding machine that can operate with simple linear movement.

It is a further object of this invention to provide a detabber for a blow molding machine that requires little or no lubrication.

It is further object of this invention to provide a detabber for a blow molding machine that can pull the tab from the bottom of a bottle and then strip the tab by positive lateral force.

Other objects and advantages of this invention will become apparent from the description to follow, particularly when read in conjunction with the accompanying drawing.

SUMMARY OF THE INVENTION

In carrying out this invention, there is provided a serrated, movable jaw or tab puller that grips the depending tab against an opposing planar surface. The jaw is moved downward in a linear path as a pusher finger thereon exerts lateral forces against the tab to strip it from the tab puller. The serrated jaw is carried on a simple, dovetail slide and a ramp along the complementary slideway projects the pusher finger laterally.

DESCRIPTION OF A PREFERRED EMBODIMENT

Figures 1, 2:
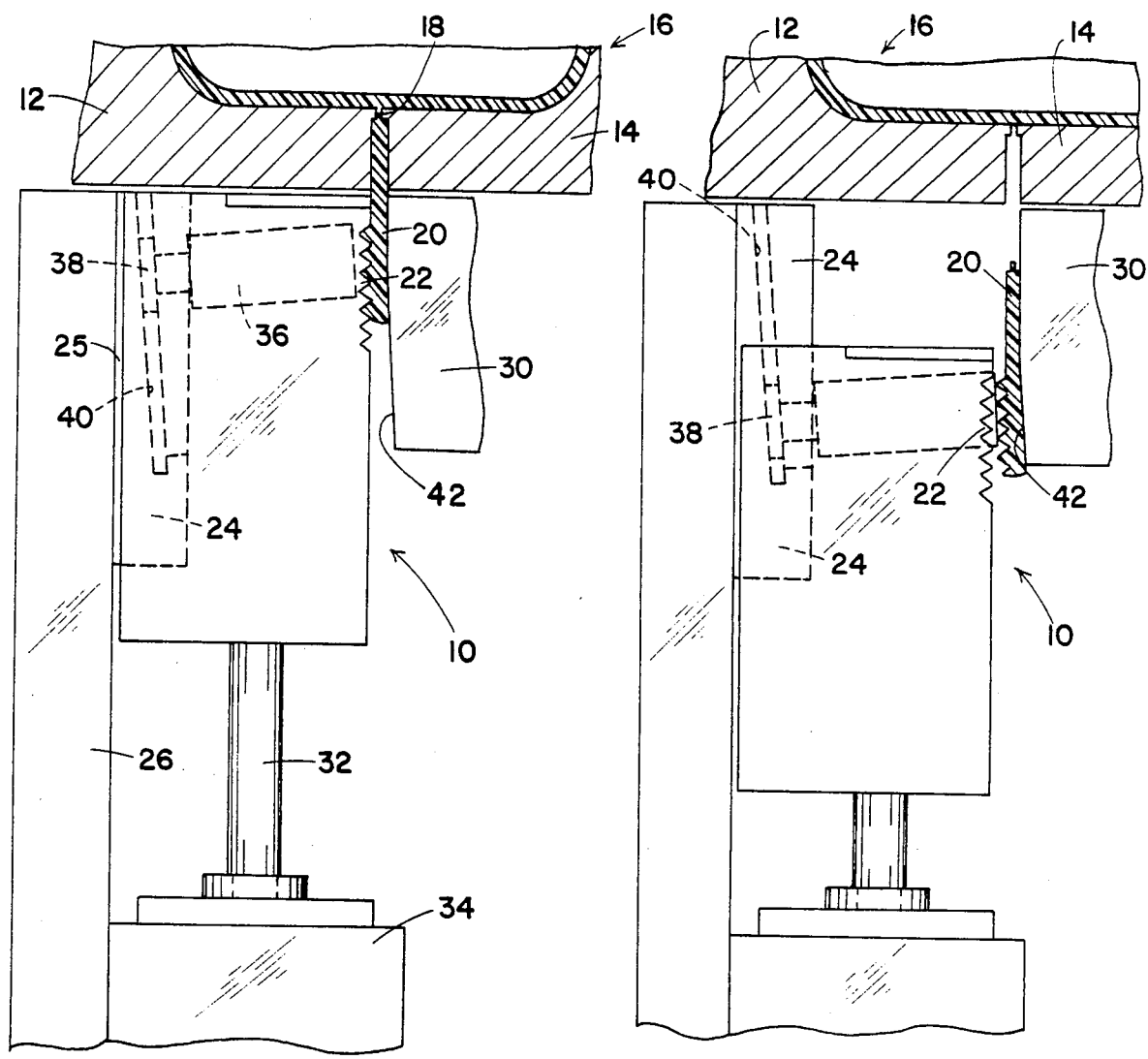
FIG. 1 is a partial side elevation of a blow molding machine with the detabber of this invention.
FIG. 2 is a partial side elevation showing the detabber with tab removed.

Referring now to the drawing with greater particularity, the tab-pulling apparatus 10 of this invention is mounted below the mold cavity halves 12 and 14 of a blow molding machine 16. In conventional practice, the mold halves 12 and 14 close on a tube of soft plastic to pinch off the bottom 18 and form a tab 20 which depends therefrom. It is a function of the detabbing apparatus 10 to remove the tab in completing the molding process.

A movable jaw or tab puller 22 is slidably carried on a slideway 24 secured to the mold body 26. Opposing the tab puller or movable jaw 22 is a stationary jaw 30 whereby the tab 20 is clamped between the tab puller 22 and the stationary jaw 30.

The tab puller 22 is moved between the extended position shown in FIG. 1 to a retracted pulling position shown in FIG. 2 by means of the piston rod 32 of a hydraulic or pneumatic cylinder 34.

Slidably carried in the movable jaw for transverse movement therein is a plunger or pusher finger 36 having a foot 38 that moves along a sloping ramp 40 carried on a stationary member 25 (FIG. 3) associated with the slideway 24. Hence, as the movable jaw slide 22 is pulled downward to the position shown in FIG. 2 the foot 38 rides up the ramp 40 to project the pusher finger or plunger 36 outward to the position shown in FIG. 2 and strip the tab 20 from the movable jaw 22. The face of the stationary jaw 30 is sloped back at 42 to diverge from the movable jaw 22 to accommodate the plunger 36 and allow the severed tab 20 to fall free of the jaws 22 and 30.

Figure 3:
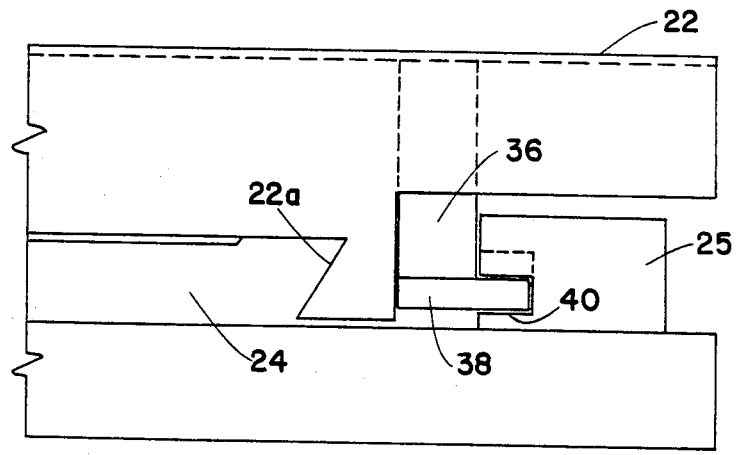
FIG. 3 is a partial top view of the tab puller and slideway.

Referring to FIG. 3, the pulling jaw 22 forms a dovetail slide 22a with the slideway 24, so that there is simple linear movement between them, with no pivoting or twisting action. The tab-pulling slide 22 and slideway 24 may be formed of oil-impregnated bronze so that there is little or no need for lubrication throughout the life of the tab-pulling apparatus 10. Similarly, the tab 20 is stripped free from the movable jaw 22 by simple sliding action of the plunger 36.

While this invention has been described in conjunction with a preferred embodiment thereof, it is obvious that modifications and changes therein may be made by those skilled in the art to which it pertains without departing from the spirit and scope of this invention, as defined by the claims appended hereto.

What is claimed is:

1. Detabbing apparatus for use with a blow molding machine wherein a hollow plastic article is formed with a tab attached thereto and depending therefrom, said apparatus comprising:

a tab puller to be mounted below said blow molding machine for movement from a position adjacent the location of said blow molding machine to a position spaced therefrom;

means on the outer surface of said tab puller for gripping a tab.

piston means secured to said tab puller for movement thereof;

a pusher finger carried on said tab puller for transverse movement thereon from a retracted position to an extended position protruding beyond said outer surface of the tab puller; and means responsive to downward movement of said tab puller for moving said pusher finger to its extended position.

2. The detabbing apparatus defined by claim 1 including:

a stationary jaw below said blow molding machine opposing said tab puller so that a tab on an object being molded is received and clamped therebetween.

3. The detabbing apparatus defined by claim 2 wherein:
   the surface of said stationary jaw opposing said tab puller is angled to diverge therefrom from top to bottom.

4. The detabbing apparatus defined by claim 1 including:
   a foot or said pusher finger;
   a stationary sloping ramp engaged by said foot to move said pusher finger outward toward said extended position as said tab puller is moved downward.

5. The detabbing apparatus defined by claim 1 including:
   a vertical dovetail slideway mounted below said blow molding machine;
   a dovetail slide slidably mounted in said slideway and carrying said tab puller.

* * * * *